(12) United States Patent
Ohtsu et al.

(10) Patent No.: US 7,187,828 B2
(45) Date of Patent: Mar. 6, 2007

(54) POLYMER OPTICAL WAVEGUIDE MODULE AND METHOD FOR MANUFACTURING POLYMER OPTICAL WAVEGUIDE FILM USED THEREFOR (75) Inventors: Shigemi Ohtsu, Nakai-machi (JP); Keishi Shimizu, Nakai-machi (JP); Kazutoshi Yatsuda, Nakai-machi (JP); Eiichi Akutsu, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/984,895

(22) Filed: Nov. 10, 2004

(65) Prior Publication Data

US 2005/0248046 A1  Nov. 10, 2005

(30) Foreign Application Priority Data

May 7, 2004  (JP) .............................. 2004-139041

(51) Int. Cl.
*G02B 6/26* (2006.01)
*G02B 6/42* (2006.01)
*G02B 6/12* (2006.01)
*G02B 6/10* (2006.01)
*G02B 6/00* (2006.01)

(52) U.S. Cl. .......................... 385/52; 385/14; 385/18; 385/39; 385/130; 264/1.24

(58) Field of Classification Search ................ 385/49, 385/88, 14, 39, 52, 130; 264/1.24
See application file for complete search history.

(56) References Cited

U.S. PATENT DOCUMENTS 5,771,322 A * 6/1998 Matsumoto et al. .......... 385/31
5,999,670 A * 12/1999 Yoshimura et al. ........... 385/31
6,322,736 B1* 11/2001 Bao et al. .................... 264/105
6,355,198 B1* 3/2002 Kim et al. .................... 264/259
6,396,082 B1* 5/2002 Fukasawa et al. ............. 257/79
6,912,334 B2* 6/2005 Koyama ....................... 385/16
2002/0181882 A1* 12/2002 Hibbs-Brenner et al. ..... 385/52
2004/0017977 A1* 1/2004 Lam et al. .................... 385/49
2004/0039122 A1* 2/2004 Morita et al. ................ 525/222

FOREIGN PATENT DOCUMENTS

| JP | 2000-39530 | 2/2000 |
|----|------------|--------|
| JP | 2000-39531 | 2/2000 |
| JP | 2000-235127 | 8/2000 |
| JP | 2002-333538 | 11/2002 |
| JP | 2004-29507 | 1/2004 |
| JP | 2004-086144 | 3/2004 |
| JP | 2004-109927 | 4/2004 |

* cited by examiner

*Primary Examiner*—Brian Healy
*Assistant Examiner*—Charlie Peng
(74) *Attorney, Agent, or Firm*—Morgan, Lewis & Bockius, LLP (57) ABSTRACT

A polymer optical waveguide module has a submount, one of an emitter and a detector and an optical waveguide. The optical waveguide is a polymer optical waveguide film obtained by using a mold, which has, on an identical end portion thereof, an optical-path converting mirror surface and an alignment surface. One of the emitter and detector as well as the polymer optical waveguide film are held on the submount. The polymer optical waveguide film is aligned on the submount by use of the alignment surface.

15 Claims, 6 Drawing Sheets

POLYMER OPTICAL WAVEGUIDE MODULE AND METHOD FOR MANUFACTURING POLYMER OPTICAL WAVEGUIDE FILM USED THEREFOR

BACKGROUND OF THE INVENTION

1. Field of the Invention

The present invention relates to a polymer optical waveguide module which is equipped with an emitter or detector, and an optical waveguide.

2. Description of the Related Arts

As a method for manufacturing a polymer optical waveguide, proposed are (1) a method of dipping a film in a monomer, selectively exposing a core portion to change its refractive index and adhering the film (selective polymerization method), (2) a method of forming a core layer and a clad layer by applying coating of core and clad materials and then forming a clad portion by reaction ion etching (RIE method), (3) a method of using photolithography by carrying out exposure and development using a UV curable resin obtained by adding a photosensitive material to a polymer material (direct exposure method), (4) a method of using injection molding; and (5) a method of forming a core layer and a clad layer by applying coating of core and clad materials, and exposing a core portion to change its refractive index (photobleaching method).

In recent IC or LSI technology, in order to improve operation speed or integration degree, optical interconnections between devices, between boards in the device or in the chip have drawn attentions instead of high-density electrical interconnections.

As a device for optical interconnections, described in Japanese Published Unexamined Patent Application No. 2000-39530 is an optical device including an emitter and a detector in a stacking direction of a core and a clad of a polymer optical waveguide in which the core has been encompassed by the clad, and further including an input-side mirror for inputting light from the emitter into the core and an output-side mirror for outputting the light from the core into the detector, wherein at positions corresponding to an optical path extending from the emitter to the input-side mirror, and an optical path extending from the output-side mirror to the detector, the clad layer is recessed to converge the light from the emitter and light from the output-side mirror. In Japanese Published Unexamined Patent Application No. 2000-39531, described is an optical element for inputting light from an emitter to the core end face of a polymer optical waveguide having a core and a clad encompassing the core, wherein the light input end face of the core is protruded toward the emitter to converge the light therefrom, whereby a waveguide loss is suppressed.

In Japanese Published Unexamined Patent Application No. 2000-235127, described is an optoelectronic integrated circuit having a polymer optical waveguide circuit fabricated directly over an optoelectronic combined circuit substrate in which an electronic device and an optical device are integrated.

In the above-described optical interconnection, if the devices as described above can be mounted and incorporated in an apparatus, fabrication of optical interconnections can be designed more freely, and as a result, an emitter or detector which is small and compacted can be obtained.

In the methods so far proposed, however, a mirror must be embedded in order to form a 90° folded mirror or an optical waveguide and an emitter or a detector must be aligned with high precision upon their adhesion. The cost necessary for mounting has been a serious problem.

SUMMARY OF THE INVENTION

The present invention addresses the foregoing problems and some embodiments provide a polymer optical waveguide module with an emitter or a detector, whose components can be aligned with high accuracy in a remarkably simple manner.

According to an embodiment of the present invention, a polymer optical waveguide module has one of an emitter and a detector, and an optical waveguide which is a polymer optical waveguide film obtained by using a mold. The polymer optical waveguide film has, on an identical end portion thereof, an optical-path converting mirror surface and an alignment surface. The polymer optical waveguide film is aligned by use of the alignment surface in module mounting.

BRIEF DESCRIPTION OF THE DRAWINGS

Embodiments of the present invention will be described in detail based on the following figures, wherein:

FIGS. 3A and 3B illustrate a submount to be used for the polymer optical waveguide module according to the embodiment of the present invention, in which FIG. 3A is its plan view and FIG. 3B is a cross-section taken along a line A—A;

FIGS. 4A and 4B illustrate the polymer optical waveguide module according to the embodiment of the present invention, in which FIG. 4A is its plan view and FIG 4B is a cross-section taken along a line A—A;

DETAILED DESCRIPTION OF THE INVENTION

The polymer optical waveguide module equipped with an emitter or detector according to an embodiment of the invention (which may be called "polymer optical waveguide module" or "module", simply) has, as components, the emitter or detector and an optical waveguide. The optical waveguide is a polymer optical waveguide film obtained by the replication of the optical waveguide using a mold. The polymer optical waveguide film is characterized in that it has, on the same end surface thereof, an optical-path converting mirror surface and alignment surface and the film is aligned in module mounting by using its alignment surface.

The optical-path converting surface in the polymer optical waveguide film is not limited insofar as it permits introduction of a light from the emitter into the core of the polymer optical waveguide or introduction of a light passing through the core into the detector. For example, the optical-path converting surface is a 45° mirror surface when the direction of light is converted by 90°.

The alignment surface is a surface for aligning the emitter or detector with the optical-path converting surface so that, when the polymer optical waveguide is mounted on the module, an optical path of the light from the emitter is converted by the optical-path converting surface and the resulting path-converted light is waveguided through the optical waveguide, or the optical path of the wave-guided light through the optical waveguide is converted and the resulting path-converted light is introduced into the detector. No particular limitation is imposed on the alignment surface insofar as it has such a function. It can be formed, for example, as a mating surface or alignment mark. The formation of the alignment surface as the mating surface facilitates alignment. Any angle can be adopted between the mating surface and the surface of the polymer optical waveguide film, but a vertical surface is advantageous for easy processing and easy alignment.

Figure 1:
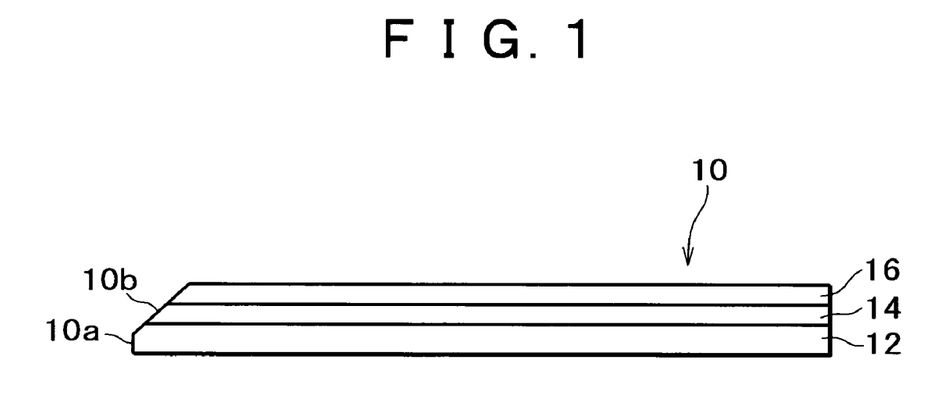
FIG. 1 illustrates the section, cut in the longitudinal direction, of a polymer optical waveguide film to be used for the polymer optical waveguide module according to an embodiment of the present invention.

FIG. 1 illustrates one example of a polymer optical waveguide film to be mounted on the polymer optical waveguide module. In FIG. 1, numeral 10 denotes a polymer optical waveguide film, 12 and 16 denote clad layers, 14 denotes a core, and 10a denotes a vertical surface to be used as a mating surface for alignment. This vertical surface is formed so as not to extend to the core. Numeral 10b denotes a 45° mirror surface as an optical-path converting surface. The path of a light from an emitter or light passing through the core is converted by 90° by this 45° mirror surface.

In order to mount the polymer optical waveguide film on the polymer optical waveguide module, a module component constituting the polymer optical waveguide module, for example, a submount which will be described later and has an alignment surface corresponding to the alignment surface formed on the polymer optical waveguide film is used. Use of these alignment surfaces facilitates alignment so as to control the relative positional relationship between the emitter or detector and the optical-path converting surface as described above. When a mating surface as described above is formed at one end portion of the polymer optical waveguide film, alignment can be performed more easily by equipping the module component with a mating surface and aligning these two surfaces.

A description will next be made of the polymer optical waveguide module having a polymer optical waveguide film and a submount each equipped with a mating surface, but the polymer optical waveguide module of the invention is not limited to it.

Figure 2:
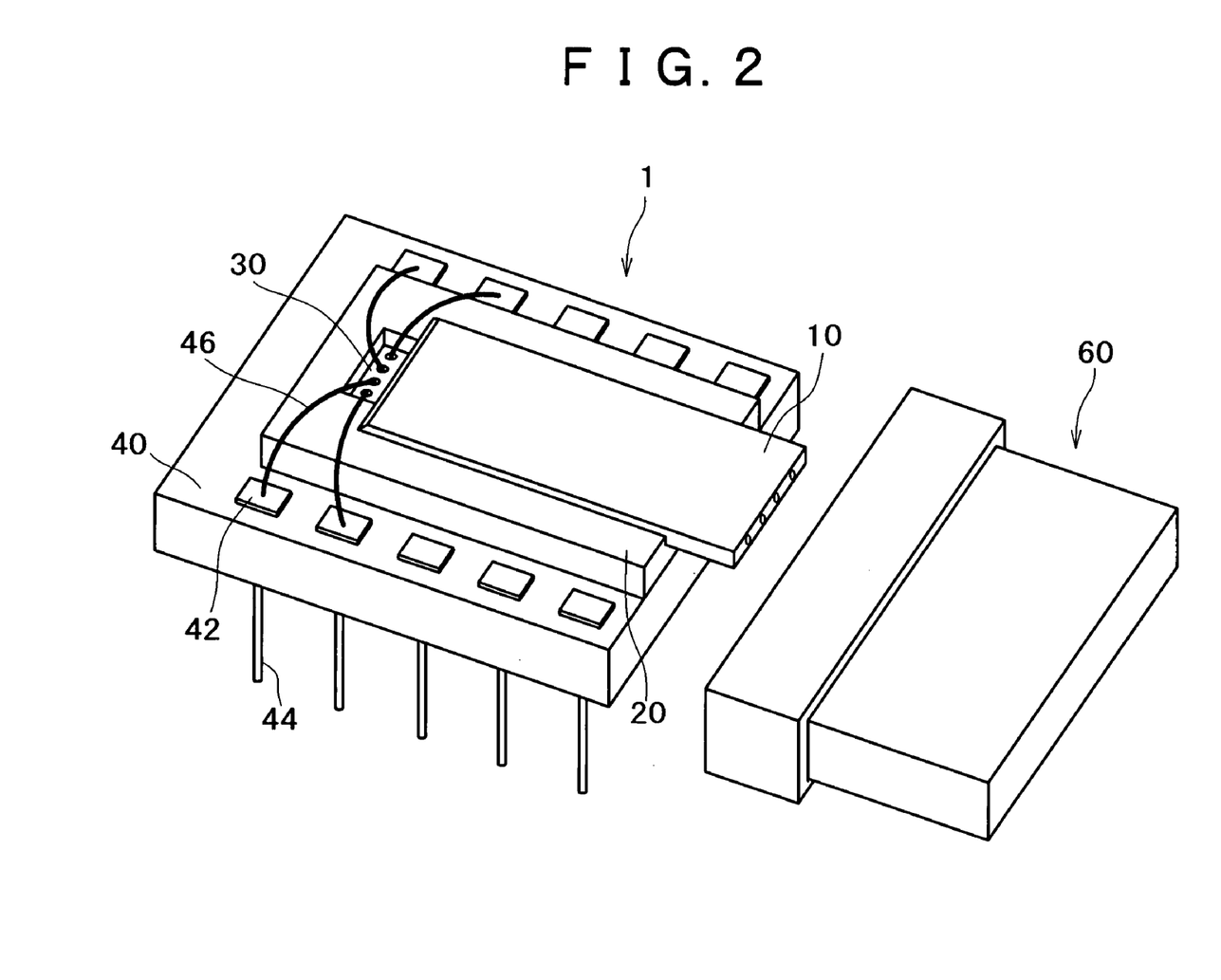
FIG. 2 is a perspective view of each of the polymer optical waveguide module according to the embodiment of the present invention and an optical connector.

In FIG. 2, numeral 1 denotes a polymer optical waveguide module, 10 denotes a polymer optical waveguide film, and 20 denotes a submount. The submount 20 holds the polymer optical waveguide film 10 and an emitter or detector 30. Numeral 40 denotes an IC package having an electrode 42 and an electrode pin 44. The electrode 42 is electrically connected to the emitter or detector via an interconnection 46. Numeral 60 denotes an optical connector. When numeral 30 denotes an emitter, the path of light from a luminous point is converted by an optical-path converting surface existing at one end of the polymer optical waveguide film, passes through a light waveguide and output from the other end of the polymer optical waveguide film. When numeral 30 denotes a detector, the path of light passing through the light waveguide is converted and reaches the light detecting point of the detector.

The other end of the polymer optical waveguide film can be connected to an optical connector 60 (for example, MT connector).

A vertical cavity surface emitter ("VCSEL" product of Fuji Xerox Co., Ltd.) and a photo diode such as GaAs or Si are used as the emitter and detector, respectively, without limitation.

Figure 3A:
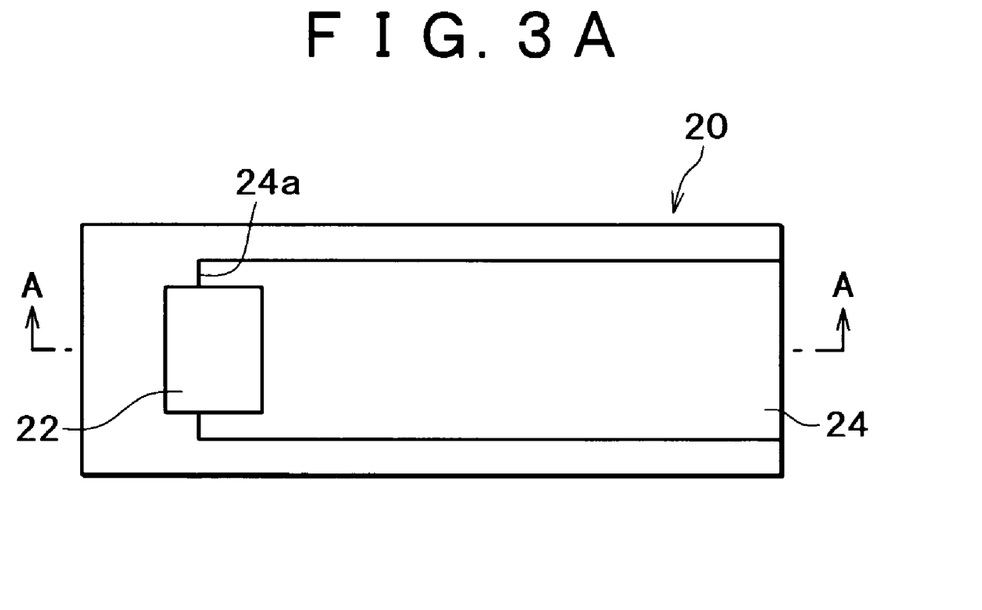
Figure 3B:
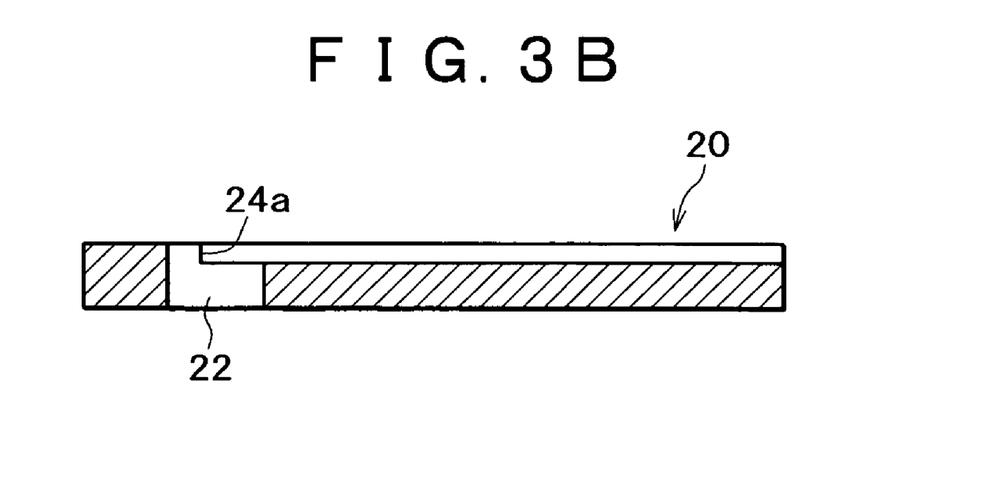

A submount will next be described based on FIGS. 3. FIG. 3A is a plan view of the submount, while FIG. 3B is a cross-sectional view taken along a line A—A of FIG. 3A. In FIGS. 3A and 3B, numeral 22 denotes a through-hole for supporting the emitter or detector 30, and 24 denotes a recess for supporting the polymer optical waveguide film. The recess may have a depth enough for supporting the polymer optical waveguide film. Numeral 24a denotes a vertical mating surface corresponding to the vertical mating surface disposed at the end portion of the polymer optical waveguide film.

Figure 4A:
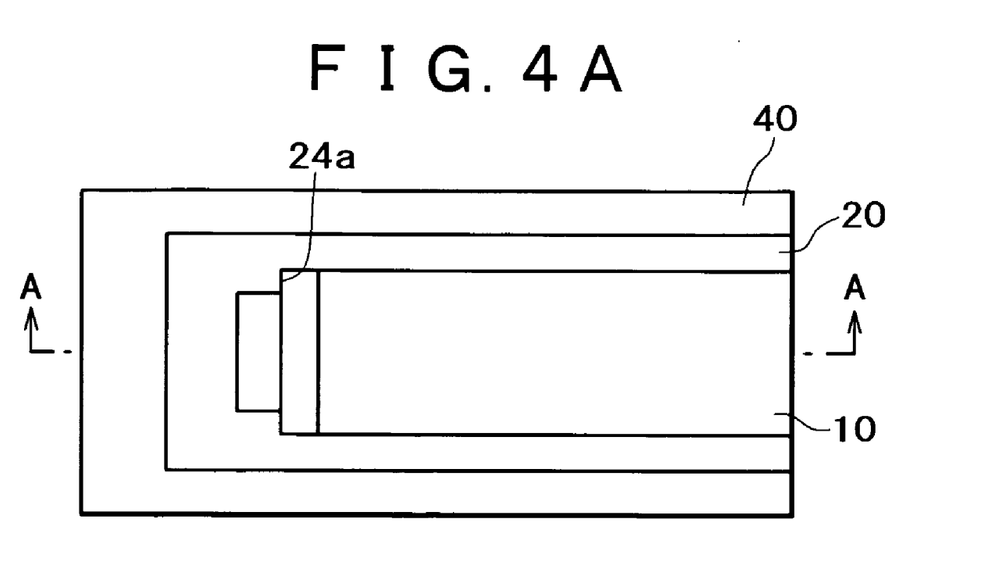
Figure 4B:
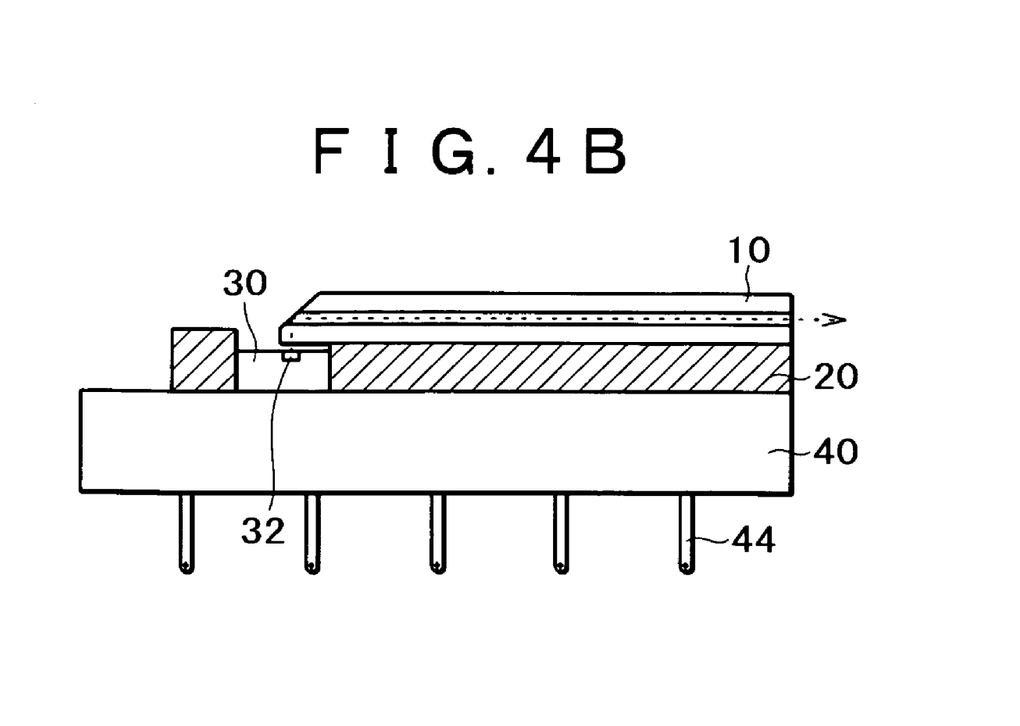

In FIGS. 4A and 4B, the emitter 30 is inserted into the through-hole (22) of the submount 20 and the vertical mating surface (10a) at one end portion of the polymer optical waveguide film 10 is pressed against the vertical mating surface 24a in the recess (24) of the submount 20. The mating surface 24a is formed at a position so that when the alignment vertical surface of the polymer optical waveguide film is pressed against this surface 24a, the path of light from the luminous point 32 of the emitter 30 is converted by 90° by an optical-path converting surface (45° mirror surface) and is waveguided in the core. Light output from the luminous point 32 changes its direction by 90° by the 45° mirror surface of the core, passes through the core and discharged from the other end of the polymer optical waveguide film. The dotted line indicates the optical path. In this embodiment, the other end of polymer optical waveguide film is aligned with the end portion of the submount. The other end of the polymer optical waveguide may extend beyond the submount as illustrated in FIG. 2, or may exist inside of the end portion of the submount.

Figure 5:
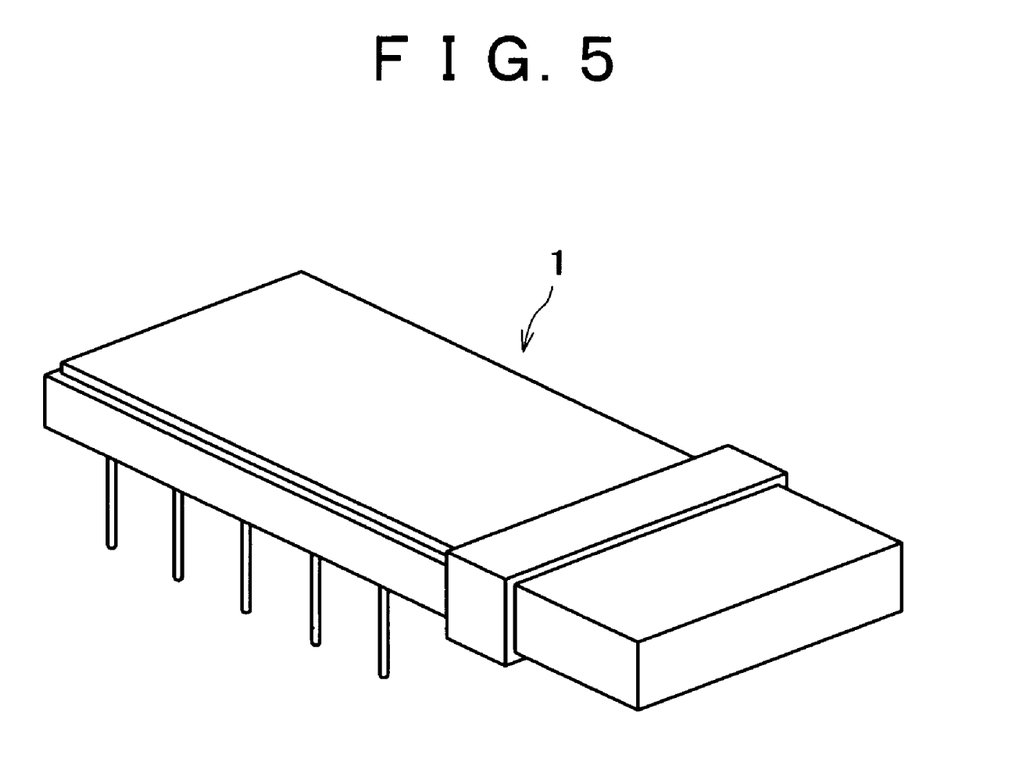
FIG. 5 illustrates the covered polymer optical waveguide module connected with an optical connector.

The polymer optical waveguide module as illustrated in FIG. 5 has a cover with which the emitter, polymer optical waveguide film and electrode have been covered. FIG. 5 illustrates one example of it. In this embodiment, the polymer optical waveguide is connected, at the other end thereof, to the optical connector.

The submount is prepared by forming, in a substrate such as Si substrate or glass substrate, a through-hole for supporting the emitter or detector therewith and a recess for supporting the polymer optical waveguide film therewith. Although no particular limitation is imposed on the forming method of the through-hole or recess, RIE (reactive ion etching) is, for example, employed. The submount according to the embodiment as illustrated in FIGS. 3 is diced at the end portion thereof.

The emitter or detector module according to embodiments of the present invention can be fabricated by fitting an emitter or detector and a polymer optical waveguide film in a predetermined processed portion (through-hole or recess) of a module component, for example, a submount.

The submount and the emitter or detector fitted in the through-hole are bonded to an IC package. A solder material or adhesive (epoxy resin adhesive) is employed for bonding and it is selected as needed, depending on the heat resistant temperature or conductivity of it.

The polymer optical waveguide film is preferably fixed to the recess of the submount with an adhesive. As the adhesive, a curable resin for clad employed for the formation of the polymer optical waveguide film, heat curable adhesive or UV curable adhesive is used. A gap between the polymer optical waveguide film and the detector or emitter, if any, may be filled with such a resin or adhesive. The adhesive has preferably a volumetric shrinkage of 10% or less.

The submount essential for the fabrication of the optical waveguide module is obtained by forming, in an Si or glass substrate by use of RIE, a recess in which VCSEL or PD is to be fitted and then forming an optical waveguide attaching portion which has been designed in advance so that light from the optical input/output portion such as VCSEL or PD enters into the core via a 45° mirror of the polymer optical waveguide.

The polymer optical waveguide equipped with an emitter or a detector can be packaged by fabricating VCSEL or PD and optical waveguide via the submount.

The polymer optical waveguide film according to some embodiments of the present invention is preferably prepared by the following processes:

1) preparing a mold which is made of a cured layer of a mold-forming curable resin and has a recess having a shape corresponding to that of the protrusion of an optical waveguide core and having, at one end and the other end portions of the recess, at least two through-holes communicated with each other;

2) tightly adhering, to the mold, a flexible film material for clad which has good adhesion with the mold;

3) filling a core-forming curable resin in a through-hole existing at one end portion of the recess of the mold to which the flexible film material has been tightly adhered, followed by vacuum suction of the resin from another through-hole at the other end portion of the recess of the mold, whereby the core-forming curable resin is filled in the recess of the mold;

4) curing the core-forming curable resin thus filled in the mold and releasing the mold from the flexible film material for clad; and 5) forming a clad layer over the flexible film material having a core formed thereover.

Figure 6A:
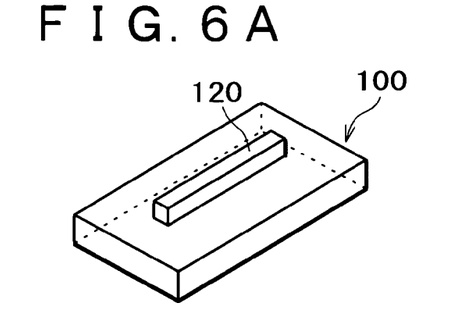
FIGS. 6A to 6G illustrate the manufacturing processes of the polymer optical waveguide film to be used for the module according to the embodiment of the present invention.
Figure 6B:
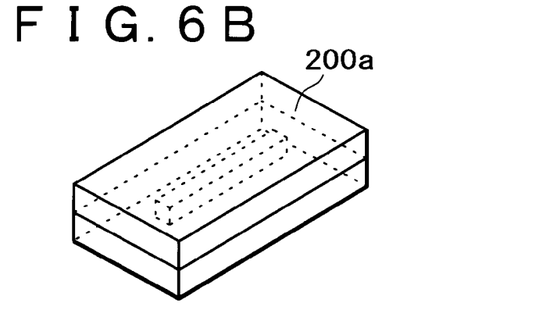
Figure 6C:
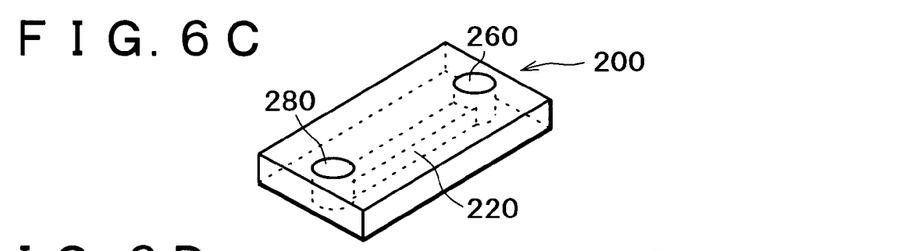

The entire preparation process of the polymer optical waveguide film will next be explained based on FIG. 6. To simplify the explanation, a polymer optical waveguide film equipped with only one optical waveguide core will next be described. In FIG. 6A, numeral 100 and 120 denote a master plate and a protrusion corresponding to the optical waveguide core. A mold-forming curable resin is applied to or poured in the surface of the master plate 100 on which the protrusion is to be formed, followed by curing (refer to FIG. 6B). In FIG. 6B, numeral 200*a* denotes a cured resin layer. By the release from the master plate, the cured resin layer 200*a* having a recess formed therein can be obtained (not illustrated). In the cured resin layer 200*a* having the recess 220 formed therein, through-holes 260 and 280 communicated with the recess 220 are formed by punching or the like at both end portions of the recess, whereby a mold 200 (refer to FIG. 6C) is obtained.

Figure 6D:
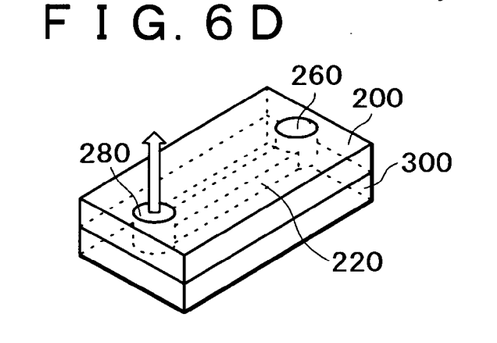
Figure 6E:
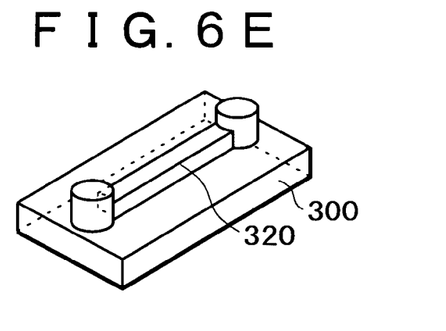

As illustrated in FIG. 6D, a flexible film material 300 for clad is tightly adhered to the mold. A core-forming curable resin is charged in the through-hole 260 formed in the mold, and then, is subjected to vacuum suction from the through-hole 280 on the other end portion of the mold to fill the recess 220 of the mold with the core-forming curable resin. By curing the resin and then releasing the mold from the thus cured resin, an optical waveguide core 320 is formed over the flexible film material 300 for clad as illustrated in FIG. 6E.

Figure 6F:
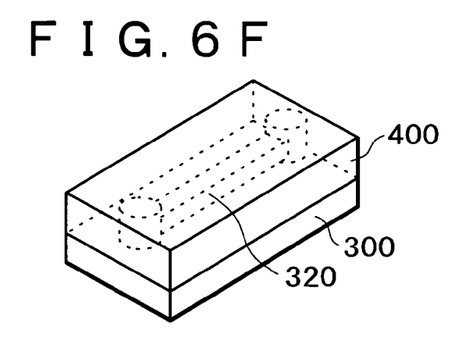
Figure 6G:
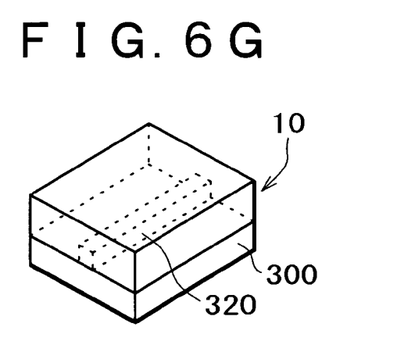

A clad layer (upper clad layer) 400 is then formed (refer to FIG. 6F) and resin portions cured in the through-holes 260 and 280 are cut off by a dicer or the like, whereby a polymer optical waveguide film can be obtained.

Each process will next be described more specifically.

1) A process of preparing a mold which is made of a cured layer of a mold-forming curable resin and has a recess having a shape corresponding to that of the protrusion of an optical waveguide core and having, at one end and the other end portions of the recess, at least two through-holes communicated with each other.

It is preferred to prepare a mold by use of a master plate with a protrusion corresponding to an optical waveguide core, but it is not necessarily be prepared by use of such a master plate. In the description below, a master plate is employed for the preparation.

For the preparation of a master plate with a protrusion corresponding to an optical waveguide core, a conventional method, for example, photolithography can be used without particular limitation. A method of preparing a polymer optical waveguide by electrodeposition or photodeposition applied for a patent previously by the present inventors (Japanese Published Unexamined Patent Application No. 2002-333538) can also be employed for the preparation of the master plate. The size of the protrusion formed on the master plate and corresponding to the optical waveguide can be determined as needed, depending on the use of the polymer optical waveguide. For a single mode optical waveguide, a core of about 10 μm square and for a multi-mode optical waveguide, a core of about 50 to 100 μm square is generally employed, for example. An optical waveguide having a core as large as several hundred μm square is also used for some purposes.

A mold is prepared, for example, by forming a mold-forming curable resin layer by applying or pouring a mold-forming curable resin to the protrusion forming surface of the master plate prepared as described above, drying the resulting master plate if necessary, curing the resin, releasing the cured resin layer from the master plate to obtain a mold with a recess corresponding to the protrusion, and forming, at both ends of the recess, through-holes communicated with each other. The through-holes can be formed, for example, by punching the mold into a predetermined shape. Even if the through-holes are formed by punching out the mold, there is no fear of a core-forming curable resin penetrating into portions other than the recess, because adhesion between the mold and film material for clad is excellent and no gap is formed with the film material for clad except the recess of the mold.

Although the thickness of the mold (resin cured layer) is determined as needed in consideration of the handling ease as a mold, thickness of from 0.1 to 50 mm is usually preferred.

It is desirable to apply a releasing agent to the master plate in advance in order to promote release from the mold.

The through-hole on the inlet side of the core-forming curable resin has a function of reservoir (for the core-forming curable resin). The through-hole on the outlet side of the core-forming curable resin is used for vacuum suction to reduce the pressure in the recess of the mold upon filling of the resin in the recess of the mold. No particular limitation is imposed on the shape or size of the through-hole on the inlet side insofar as it is communicated with the inlet end of the recess and has a function of a reservoir. The shape or size of the through-hole on the outlet side is not particularly limited either insofar as it is communicated with the exit end of the recess and can be used for vacuum suction.

The through-hole disposed on the inlet side of the core-forming curable resin in the recess of the mold has a function as a reservoir. When the mold is tightly adhered to the clad film material, the mold having a cross-section greater on the side contiguous to the film material and smaller on the side apart from the film material can be released from the film material easily upon release after filling the recess with the core-forming curable resin and curing. The through-hole on the outlet side of the core-forming curable resin is not necessarily imparted with a function as a reservoir so that it does not need to have such a cross-section.

As another example, a mold is prepared by forming, on the master plate, not only a protrusion corresponding to the optical waveguide but also another protrusion (the height of this protrusion is greater than the thickness of the cured layer of the mold-forming curable resin) for the formation of a through-hole, applying the mold-forming curable resin to the master plate so that the protrusion for the formation of the through-hole goes through the resin layer, curing the resin layer and then releasing the cured resin layer from the master plate.

The mold-forming curable resin to be used for the formation of the mold preferably has following properties: the cured resin can be easily released from the master plate; the resin, as a mold (used in repetition), has mechanical stability and size stability exceeding a certain level; the resin has sufficient hardness to maintain the recessed shape; and the resin has good adhesion with the film material for clad.

The mold-forming curable resin preferably has a viscosity below a certain level, for example, about 500 to 7000 mPa·s because it can be applied to or poured in the surface of the master plate and it must copy, with high accuracy, the recess corresponding to each of the optical waveguide cores formed on the master plate (the "mold-forming curable resin" to be used in the embodiments of the invention embraces that converted into rubber having elasticity after curing). A solvent for viscosity adjustment can be added to the resin in an amount not adversely affecting the resin.

As the mold-forming curable resin, a curable organopolysiloxane which becomes a silicone rubber (silicone elastomer) or silicone resin by curing is preferred from the viewpoints of easy release, mechanical strength, size stability, hardness and adhesion with the clad film material, as described above. The curable organopolysiloxane preferably contains, in the molecule thereof, a methylsiloxane group, ethylsiloxane group or phenylsiloxane group. The curable organopolysiloxane may be either one-component type or a two-component type used in combination with a curing agent. It may be cured by heating or at room temperature (for example, cured by moisture in the air). Another type, for example, UV curable type can also be used.

The curable polyorganopolysiloxane which becomes a silicone rubber after curing is preferred and, for example, that usually called a liquid silicone rubber (the term "liquid" embraces a highly viscous state such as paste) is used. A two-component type containing a curing agent as the second component is preferred. Especially, addition type liquid silicone rubber is preferred, because it cures uniformly, in both surface and inside thereof, in a short time, generates no or less side products, has excellent releasability and exhibits small shrinkage.

Of the liquid silicone rubbers, liquid dimethylsiloxane rubber is especially preferred from the standpoints of adhesion, releasability, strength and hardness. The liquid dimethylsiloxane rubber after curing has a refractive index as low as 1.43 so that a mold made from this rubber can be used as it is as a clad layer without being released from the clad film material. In this case, some devices must be configured to prevent release of the mold from the core forming resin filled in the mold and the clad film material.

The liquid silicone preferably has a viscosity of from about 500 to 7000 mPa·s, more preferably from about 2000 to 5000 mPa·s in consideration that the rubber must accurately copy the protrusion corresponding to the optical waveguide core, mixing of air bubbles is minimized to facilitate defoaming and the mold having a thickness of several mm is formed.

The surface energy of the mold preferably falls within a range of from 10 dyn/cm to 30 dyn/cm, more preferably from 15 dyn/cm to 24 dyn/cm from the viewpoint of adhesion with the film material.

The Shore hardness of the mold is preferably from 15 to 80, more preferably from 20 to 60 from the viewpoints of the copying performance, shape retention of the recess and releasability.

The surface roughness (root mean square roughness (RMS)) of the mold is adjusted to 0.2 μm or less, preferably 0.1 μm or less from the viewpoint of copying performance.

The mold is preferably light transmissive in a UV region and/or a visible region. The reason why the mold is preferably light transmissive in the visible region is because it facilitates alignment when the mold is adhered to the film material for clad in the below-described process (2) and the filling work of the core-forming curable resin in the recess of the mold in the below-described process (3) can be observed and completion of the filling can be confirmed easily. The reason why the mold is preferably light transmissive in the UV region is because when a UV curable resin is used as the core-forming curable resin, the resin is UV cured through the mold. The transmittance of the mold in the UV region (250 nm to 400 nm) is preferably 80% or greater.

The curable organopolysiloxane, especially liquid silicone rubber which becomes silicone rubber after curing is excellent in two contradictory properties, that is, adhesion and releasability with the film material for clad, has capacity of copying a nanostructure accurately and can prevent the penetration of a liquid when tightly adhered with the film material for clad. A mold made of such silicone rubber can copy the master plate with high accuracy and adheres well to the film material for clad so that the core forming resin can be filled in the recess between the mold and film material for clad efficiently and moreover, the mold can be released from the film material for clad readily. Accordingly, a polymer waveguide having its shape maintained with high accuracy can be formed in a remarkably simple manner.

(2) A process of tightly adhering, to the mold, a flexible film material for clad which has good adhesion with the mold An optical device fabricated using the polymer optical waveguide according to the embodiments of the invention can be used for optical interconnections of various levels so that depending on the use of the optical device, the flexible film material for clad is selected in consideration of optical properties such as refractive index and light transmittance, mechanical strength, heat resistance, adhesion with the mold and flexibility. Examples of the film include alicyclic acrylic resin films, alicyclic olefin resin films, cellulose triacetate films, and fluorine-containing resin films. The refractive index of the film material is preferably adjusted to less than 1.55, preferably less than 1.53 in order to keep a difference in the refractive index with the core.

The alicyclic acrylic resin films include "OZ-1000" and "OX-1100" (each, product of Hitachi Chemical Co., Ltd.) having an ester substituent in which an aliphatic cyclic hydrocarbon such as tricyclodecane has been introduced.

The alicyclic olefin resin films include those having, in the main chain thereof, a norbornene structure and those having, in the main chain thereof, a norbornene structure and in its side chain a polar group such as alkyloxycarbonyl (having, as an alkyl moiety, a $C_{1-6}$ alkyl group or a cycloalkyl group). Of these, the alicyclic olefin resin having, in the main chain thereof, a norbornene structure and in its side chain a polar group such as alkyloxycarbonyl group has excellent optical properties, for example, low refractive index (a refractive index of about 1.50 and a difference in the refractive index between core and clad can be maintained) and high light transmittance, has excellent adhesion with the mold and has excellent heat resistance, so that it is suited for the manufacture of the optical waveguide sheet used in the embodiments of the invention.

The thickness of the film material is selected properly in consideration of the flexibility, rigidity and handling ease and thickness of about 0.1 mm to 0.5 mm is usually preferred.

(3) A process of filling a core-forming curable resin in a through-hole existing at one end of the recess of the mold to which the flexible film material for clad has been tightly adhered, followed by vacuum suction of the resin from another through-hole at the other end of the recess of the mold to fill the recess of the mold with the core-forming curable resin In this process, the core-forming curable resin is filled in the through-hole disposed on the inlet side of the resin and is filled in a gap (recess of the mold) formed between the mold and film material for clad by vacuum suction of the resin from the through-hole disposed on the outlet side of the resin. Vacuum suction improves adhesion between the mold and film material for clad, making it possible to avoid mixing of air bubbles. The vacuum suction is carried out, for example, by inserting a suction tube into the through-hole disposed on the outlet side and connecting the suction pipe to a pump.

As the core-forming curable resin, any one of radiation curable, electron beam curable and heat curable resins can be used. Of these, UV curable resin and heat curable resin are preferred.

As the UV curable or heat curable resin for core formation, UV curable or heat curable monomers, oligomers or mixtures of monomer and oligomer are preferred.

As the UV curable resin, epoxy, polyimide or acrylic UV curable resins are preferred.

The core-forming curable resin is filled in a gap (recess of the mold) formed between the mold and film material by a capillary phenomenon so that the core-forming curable resin must have viscosity low enough to permit the capillary phenomenon. The viscosity of the curable resin is preferably adjusted to fall within a range of from 10 mPa·s to 2000 mPa·s, preferably from 20 mPa·s to 1000 mPa·s, more preferably from 30 mPa·s to 500 mPa·s.

In addition, a volumetric change of the curable resin after curing relative to the volume before curing is required to be small in order to reproduce, with high accuracy, the original shape of the protrusion corresponding to the optical waveguide core formed on the master plate. A decrease in volume is causative of a waveguide loss. Accordingly, the volumetric change of the core-forming curable resin is preferably as small as possible and preferably 10% or less, more preferably 6% or less. A viscosity reduction with a solvent is not recommended because a volumetric change before and after curing is large.

A polymer can be added to the resin in order to minimize the volumetric change (shrinkage) after curing of the core-forming curable resin. It is preferred that the polymer has compatibility with the core-forming curable resin and at the same time, it does not adverse affect the refractive index, modulus of elasticity and transmission properties of the resin. By the addition of the polymer, it is possible to minimize the volumetric change and in addition, severely control the viscosity or glass transition point of the curable resin. Examples of the polymer include, but not limited to, acrylic, methacrylic acid, and epoxy polymers.

The refractive index of the core-forming curable resin after curing must exceed that of the film material (including the clad layer in the below-described process (5)) which will be a clad. It is 1.50 or greater, preferably 1.53 or greater. The difference in the refractive index between the clad (including the clad layer in the below-described process (5)) and the core is 0.01 or greater, preferably 0.03 or greater.

(4) A process of curing the core-forming curable resin thus filled in the recess and releasing the mold from the film material for clad In this process, the core-forming curable resin filled in the recess is cured. For the curing of the UV curable resin, a UV lamp, UV LED or UV irradiator is employed, while for the curing of the heat curable resin, it is heated in an oven.

The mold used in the processes (1) to (3) can be used as it is as a clad layer if it satisfies the conditions of a clad layer such as refractive index. In this case, release of the mold is not necessary and the mold is used as is as a clad layer. In this case, the mold is preferably subjected to ozone treatment to improve the adhesion between the mold and core material.

(5) A process of forming a clad layer over the film material for clad having a core formed thereover A clad layer is formed over the film material having a core formed thereover. As the clad layer, a film (for example, a film material for clad used in the process (2) can also be employed here), a layer obtained by applying a curable resin for clad and curing the resin, or a polymer film available by applying a solution of a polymer material in a solvent and then drying the film. As the curable resin for clad, UV curable resins and heat curable resins are preferred. For example, UV curable or heat curable monomers, oligomers or mixtures of the monomer and oligomer are used.

In order to minimize the volumetric change (shrinkage) after curing of the curable resin for clad, a polymer having compatibility with the resin and not adversely affecting the refractive index, modulus of elasticity and transmission properties of the resin (for example, methacrylic acid or epoxy polymer) can be added.

When a film is used as the clad layer, it is adhered with an adhesive. The refractive index of the adhesive is preferably close to that of the film. UV curable resins or heat curable resins are preferably employed as the adhesive. For example, UV curable or heat curable monomers, oligomers or mixtures of the monomer and oligomer are used.

In order to minimize the volumetric change (shrinkage) after curing of the UV curable resin or heat curable resin, a polymer similar to that added to the clad layer can be added.

The refractive index of the clad layer is preferably adjusted to 1.55 or less, more preferably 1.53 or less in order to keep an adequate difference in the refractive index between the clad layer and core. From the viewpoint of confinement of light, the refractive index of the clad layer is preferably adjusted to be equal to that of the film material.

The above-described preparation process of the polymer optical waveguide film is accomplished based on the finding that when a flexible film material for clad having good adhesion with the mold is tightly adhered to the mold, no gap appears between the mold and film material except the recess formed in the mold without employing any special bonding means, and the core-forming curable resin can be introduced only in the recess. The polymer optical waveguide film can thus be prepared easily in a remarkably simplified preparation manner. A polymer optical waveguide film can be obtained at a considerably low cost by the process according to the embodiment of the invention, compared with the conventional manufacturing process. In addition, according to the above-described preparation method of the polymer optical waveguide, formation of a through-hole in the mold and vacuum suction on the outlet side of the core-forming curable resin in the recess of the mold make it possible to improve the adhesion between the mold and film material, thereby avoiding mixing of air bubbles. Moreover, although the method is simple, the polymer optical waveguide film obtained thereby is highly precise with a less waveguide loss and can be installed to various apparatuses freely.

The optical-path converting mirror surface at the end portion of the polymer optical waveguide film can be formed easily by dicing with an angled blade. For conversion of the optical path by 90°, dicing may be carried out with a dicing saw with a 45°-angled blade for Si. The alignment surface which is, for example, a vertical surface (relative to the surface of the polymer optical waveguide film) can be formed by perpendicularly, relative to the longitudinal direction of the polymer optical waveguide film, cutting a predetermined length of the tip portion including the clad portion with a dicing saw (refer to the alignment surface 10a in FIG. 1).

Embodiments

The present invention will hereinafter be described in further detail by the below-described embodiments. It should however be borne in mind that the invention is not limited to or by them.

Embodiment 1

A thick film resist ("SU-8", product of MicroChem Corp.) is applied to an Si substrate by spin coating, prebaked at 80° C., exposed through a photomask and developed, whereby four protrusions (width: 50 μm, height: 50 μm, length: 80 mm) each having a square cross-section are formed. The distance between any two adjacent protrusions is set at 250 μm. By post-baking at 120° C., a master plate for the preparation of a polymeric optical waveguide is formed.

After application of a releasing agent to the resulting master plate, a mixture of a heat curable liquid dimethylsiloxane rubber ("SYLGARD 184", product of Dow Corning Asia, viscosity: 5000 mPa·s) and a curing agent therefor is poured in the master plate. The rubber is cured by heating at 120° C. for 30 minutes and then peeled from the master plate, whereby a mold (thickness: 5 mm) having a recess corresponding to the protrusion having a square cross-section is prepared.

The mold is then punched out at both ends thereof to form through-holes having a round planar shape and a tapered cross-section in the mold thickness direction so as to communicate with the recess, whereby the mold formation is completed. The through-hole of the mold on the inlet side of a core-forming curable resin has a diameter of 4 mm on the surface adjacent to the film material for clad and a diameter of 3.5 mm on the opposite surface of the mold. The through-hole for vacuum suction is formed with an equal size but with a reverse taper to the through-hole on the inlet side.

To this mold, a film base material for clad ("ARTON FILM", product of JSR, refractive index: 1.510) one size greater than the mold and having a thickness of 100 μm is adhered. Several drops of a UV curable resin (product of NTT-AT) having a viscosity of 850 mpa·s are dropped in the inlet-side through-hole of the mold, followed by vacuum suction through the outlet-side through-hole (vacuum suction side). The UV curable resin is filled in the recess in 20 minutes. UV rays of 50 mW/cm$^2$ are then irradiated downward for five minutes to the mold to cause UV curing. The mold is released from the ARTON FILM. As a result, a core having a similar shape to that of the protrusion of the master plate is formed over the ARTON FILM. The core has a refractive index of 1.535.

After application of a UV curable resin (product of "NTT-AT") equal in a refractive index after curing to that of ARTON FILM, that is, 1.510 to the core-formed surface of the ARTON FILM, a film material ("ARTON FILM", product of JSR, refractive index: 1.510) for clad having a thickness of 100 μm is adhered to the resulting film, followed by exposure to UV light of 50 μmW/cm$^2$ for five minutes to cause UV curing and adhesion of two films, whereby a polymer optical waveguide film of 300 μm thick is obtained.

The optical waveguide sheet is cut perpendicularly relative to the longitudinal direction of the core by use of a dicing saw equipped with a 45°-angled blade for Si to expose the core having a 45° mirror surface. The end portion of the clad is cut at perpendicularly and vertically relative to the longitudinal direction of the polymer optical waveguide film, whereby a vertical cross-section (refer to FIG. 110a) having a height of 50 μm from the bottom is formed. The polymer optical waveguide film has, at the same end portion thereof, both a 45° mirror surface and a vertical alignment surface.

A through-hole for installing an emitter is formed by RIE in an Si substrate having a thickness of 250 μm. After a recess of 50 μm for holding the polymer optical waveguide film is formed by RIE, an end portion of it is cut by a dicer, whereby an Si submount is formed.

Between an IC package made or ceramics and the Si submount and emitter (four-channel array type, product of Fuji Xerox Co., Ltd., array distance: 250 μm), an Sn—Au solder is inserted. By heating to 250° C., the emitter and Si submount are fixed to the IC package. The alignment surface of the polymer optical waveguide film is pressed against the alignment surface of the recess of the Si submount, and then, the polymer optical waveguide film is adhered with a UV curable adhesive to the surface of the recess in the submount. As a final process, wiring of the emitter is carried out by use of a wire bonder, whereby a polymer optical waveguide module equipped with an emitter is obtained.

Upon mounting of the module, it is possible to carry out precise alignment of the luminous point of the emitter with the optical-path converting surface of the polymer optical waveguide film only by pressing the alignment surface of the polymer optical waveguide film against the alignment surface of the submount.

Embodiment 2

In a similar manner to Embodiment 1 except for the change of the emitter to a GaAs photo diode, a polymer optical waveguide module equipped with a detector may be manufactured.

Even if the emitter is substituted by the photo diode, precise alignment is carried out easily.

Embodiment 3

In a similar manner to Embodiment 1 except for the use of a submount made of glass instead, a polymer optical waveguide module equipped with an emitter may be manufactured.

Embodiment 4

In a similar manner to Embodiment 2 except for the use of a submount made of glass instead, a polymer optical waveguide module equipped with a detector may be manufactured.

As described above, there may be provided a polymer optical waveguide module as follows.

According to an embodiment of the present invention, a polymer optical waveguide module includes: one of an emitter and a detector; and an optical waveguide which is a polymer optical waveguide film obtained by using a mold. The polymer optical waveguide film has, on an identical end portion thereof, an optical-path converting mirror surface and an alignment surface. The polymer optical waveguide film is aligned by use of the alignment surface in module mounting.

According to another embodiment of the invention, a polymer optical waveguide module includes: a submount; one of an emitter and a detector; and an optical waveguide which is a polymer optical waveguide film obtained by using a mold. The polymer optical waveguide film has, on an identical end portion thereof, an optical-path converting mirror surface and an alignment surface. One of the emitter and detector as well as the polymer optical waveguide film are held on the submount, and the polymer optical waveguide film is aligned on the submount by use of the alignment surface.

The optical-path converting mirror surface may be a 45° mirror surface and the alignment surface may be a vertical surface.

The optical-path converting mirror surface and the alignment surface may be formed by cutting an end portion of the polymer optical waveguide film.

The 45° mirror surface may be formed by cutting an end portion of the polymer optical waveguide film with a 45°-angled blade.

The submount may have a through-hole that holds therein one of the emitter and detector, and a recess that holds therein the polymer optical waveguide film.

The submount may be made of an Si substrate, or alternatively, made of glass.

A clad of the polymer optical waveguide film may be a flexible film made of an alicyclic olefin resin.

The alicyclic olefin resin film may have a norbornene structure in a main chain and a polar group in a side chain.

The polymer optical waveguide film and one of the emitter and the detector may be bonded with an adhesive. The adhesive may be a clad material constituting the optical waveguide. Alternatively, the adhesive may be a heat curable adhesive or a UV curable adhesive having a volumetric shrinkage of 10% or less.

According to another embodiment of the invention, a method for manufacturing a polymer optical waveguide film used for the polymer optical waveguide module includes: tightly adhering a flexible film material for forming a clad to a mold, the mold having a recess with a shape corresponding to that of the protrusion of an optical waveguide core and at least two through-holes at both end portions of the recess; filling a curable resin for forming a core in one of the through-holes existing at one end portion of the recess of the mold; performing vacuum suction of the curable resin from another through-hole at the other end portion of the recess to fill the curable resin in the recess; and curing the curable resin thus filled in the mold and releasing the mold from the flexible film material.

Since the polymer optical waveguide module of the present invention has an alignment surface as described above on one end portion of a polymer optical waveguide film and moreover, has an optical-path converting surface and the alignment surface on the same end portion of the optical-path converting surface, the emitter or detector and the optical-path converting surface can be aligned easily with high accuracy when mounting of the module. The optical-path is converted on the optical-path converting mirror surface disposed in the polymer optical waveguide film and a mirror made especially for this purpose is therefore not necessary. Such a remarkably simple structure facilitates mounting to a module and the module thus obtained is very compact.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-139041 filed on May 7, 2004 including specification, claims, drawings and abstract is incorporated herein by reference in its entirety.

What is claimed is:

1. A polymer optical waveguide module comprising:
   an integrated circuit package having a first plurality of electrodes disposed on a first surface and a second plurality of electrodes disposed on a second surface opposite to the first surface;
   a module mounting disposed on the first surface of the integrated circuit package, the module mounting including a through-hole and vertical mating surfaces disposed at opposing sides of the through-hole;
   one of an emitter and a detector disposed in the through-hole of the module mounting; and
   an optical waveguide being a polymer optical waveguide film obtained by using a mold, the polymer optical waveguide film having, on an identical end portion thereof, an optical-path converting mirror surface and an alignment surface,
   wherein the alignment surface of the polymer optical waveguide film contacts and is aligned with the vertical mating surfaces of the module mounting and the optical-path converting mirror surface of the polymer optical waveguide film is aligned with the through-hole of the module mounting, and
   wherein the one of an emitter and a detector is electrically connected to the second plurality of electrodes via the first plurality of electrodes.

2. The polymer optical waveguide module according to claim 1, wherein the optical-path converting mirror surface is a 45° mirror surface and the alignment surface is a vertical surface.

3. The polymer optical waveguide module according to claim 1, wherein the optical-path converting mirror surface and the alignment surface are formed by cutting an end portion of the polymer optical waveguide film.

4. The polymer optical waveguide module according to claim 2, wherein the 45° mirror surface is formed by cutting an end portion of the polymer optical waveguide film with a 45°-angled blade.

5. The polymer optical waveguide module according to claim 1, wherein a clad of the polymer optical waveguide film is a flexible film made of an alicyclic olefin resin.

6. The polymer optical waveguide module according to claim 5, wherein the alicyclic olefin resin film has a norbornene structure in a main chain and a polar group in a side chain.

7. The polymer optical waveguide module according to claim 1, wherein the polymer optical waveguide film and one of the emitter and the detector are bonded with an adhesive.

8. The polymer optical waveguide module according to claim 7, wherein the adhesive is a clad material constituting the optical waveguide.

9. The polymer optical waveguide module according to claim 7, wherein the adhesive is a heat curable adhesive having a volumetric shrinkage of 10% or less.

10. The polymer optical waveguide module according to claim 7, wherein the adhesive is a UV curable adhesive having a volumetric shrinkage of 10% or less.

11. A polymer optical waveguide module comprising:
a submount including a through-hole and alignment mating surfaces disposed at opposing sides of the through-hole;
one of an emitter and a detector disposed in the through-hole; and
an optical waveguide being a polymer optical waveguide film obtained by using a mold, the polymer optical waveguide film having, on an identical end portion thereof, an optical-path converting mirror surface and an alignment surface,
wherein the optical-path converting mirror surface of the polymer optical waveguide film is aligned on the submount by use of the alignment mating surfaces, and
wherein the submount contacts the optical waveguide substantially along a majority length of the optical waveguide.

12. The polymer optical waveguide module according to claim 11, wherein the submount holds the one of the emitter and detector in the through-hole, and further includes a recess that holds therein the polymer optical waveguide film.

13. The polymer optical waveguide module according to claim 11, wherein the submount is made of an Si substrate.

14. The polymer optical waveguide module according to claim 11, wherein the submount is made of glass.

15. A method for manufacturing a polymer optical waveguide film used for a polymer optical waveguide module, the method comprising:
tightly adhering a flexible film material for forming a clad to a mold, the mold having a recess with a shape corresponding to that of the protrusion of an optical waveguide core and at least two through-holes at both end portions of the recess, each of the through-holes extending along a direction perpendicular to recess;
filling a curable resin for forming a core in one of the through-holes existing at one end portion of the recess of the mold;
performing vacuum suction of the curable resin from another through-hole at the other end portion of the recess to fill the curable resin in the recess;
curing the curable resin thus filled in the mold and releasing the mold from the flexible film material, and
removing the cured resin at opposing end portions of the optical waveguide core along a direction perpendicular to the optical waveguide core.

* * * * *